US011967028B2

(12) United States Patent
Staton et al.

(10) Patent No.: US 11,967,028 B2
(45) Date of Patent: Apr. 23, 2024

(54) WATCH HAVING AN INTELLIGENT DISPLAY SYSTEM

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 111 days.

(21) Appl. No.: 17/594,240

(22) PCT Filed: Apr. 13, 2020

(86) PCT No.: PCT/US2020/027973
§ 371 (c)(1),
(2) Date: Oct. 7, 2021

(87) PCT Pub. No.: WO2020/214535
PCT Pub. Date: Oct. 22, 2020

(65) Prior Publication Data
US 2022/0180614 A1    Jun. 9, 2022

Related U.S. Application Data

(60) Provisional application No. 62/835,062, filed on Apr. 17, 2019.

(51) Int. Cl.
*G06T 19/00*   (2011.01)
*G04G 9/00*   (2006.01)
(Continued)

(52) U.S. Cl.
CPC ........... *G06T 19/006* (2013.01); *G04G 9/007* (2013.01); *G04G 21/025* (2013.01); *G09G 3/002* (2013.01);
(Continued)

(58) Field of Classification Search
None
See application file for complete search history.

(56) References Cited

U.S. PATENT DOCUMENTS

| 4,488,818 A | 12/1984 | Saurer et al. |
| 2004/0195774 A1 | 10/2004 | Segan et al. |

(Continued)

FOREIGN PATENT DOCUMENTS

| EP | 1213631 A1 * | 6/2002 | ........... G04G 9/0082 |
| EP | 1213631 A1 | 6/2002 | |

OTHER PUBLICATIONS

International Search Report and Written Opinion, dated Apr. 13, 2020, 11 pages, issued in PCT Application No. PCT/US2020/027973.

*Primary Examiner* — David H Chu
(74) *Attorney, Agent, or Firm* — AVEK IP, LLC

(57) ABSTRACT

A display system includes a watch having a watch face; and an intelligent display system. The display system includes a display panel, a selectively opaque panel, a memory having programming instructions, and a controller in communication with the display panel and the selectively opaque panel, and the memory. The display system is operable in each of: (a) display mode wherein the display panel is actuated by the controller to display image content, and at least a portion of the selectively opaque panel is opaque; (b) a transparent mode wherein the display panel does not display image content, the selectively opaque panel is substantially transparent, and the watch face is substantially visible; and (c) an augmented reality mode wherein the display panel is actuated by the controller to display image content, and the selectively opaque panel is substantially transparent, the watch face being substantially visible behind the display system.

20 Claims, 6 Drawing Sheets

(51) Int. Cl.
   *G04G 21/02* (2010.01)
   *G09G 3/00* (2006.01)
(52) U.S. Cl.
   CPC ..... *G09G 2340/12* (2013.01); *G09G 2354/00* (2013.01)

(56) References Cited

U.S. PATENT DOCUMENTS

| | | |
|---|---|---|
| 2005/0174308 A1 | 8/2005 | Matlock et al. |
| 2013/0300265 A1* | 11/2013 | Senatori ................ H05K 5/068 312/7.2 |
| 2018/0068301 A1* | 3/2018 | Abdulrahiman ... G06Q 20/3278 |
| 2018/0150032 A1 | 5/2018 | Kang et al. |
| 2018/0182314 A1 | 6/2018 | Staton et al. |
| 2019/0196411 A1* | 6/2019 | Yuen ................... A61B 5/02416 |
| 2020/0174298 A1* | 6/2020 | Davis ................. G02F 1/13318 |

\* cited by examiner

WATCH HAVING AN INTELLIGENT DISPLAY SYSTEM

CROSS REFERENCE TO RELATED APPLICATIONS

This application is the U.S. national phase of, and claims priority to, International Application No. PCT/US2020/027973, filed Apr. 13, 2020, which claims priority to U.S. Provisional Patent Application Ser. No. 62/835,062, filed Apr. 17, 2019, the disclosure of which is incorporated by reference herein in its entirety.

FIELD OF THE DISCLOSURE

The disclosure relates generally to the field of watches. More specifically, the disclosure relates to a watch using a multilayered intelligent display.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a display system includes a watch having a watch face; and an intelligent display system. The display system includes a display panel, a selectively opaque panel, a memory having programming instructions, and a controller in communication with the display panel and the selectively opaque panel, and the memory. The display system is operable in each of: (a) display mode wherein the display panel is actuated by the controller to display image content, and at least a portion of the selectively opaque panel is opaque; (b) a transparent mode wherein the display panel does not display image content, the selectively opaque panel is substantially transparent, and the watch face is substantially visible; and (c) an augmented reality mode wherein the display panel is actuated by the controller to display image content, and the selectively opaque panel is substantially transparent, the watch face being substantially visible behind the display system.

In another embodiment, a display system includes a watch having a watch face and a rotational member configured to rotate about a point of rotation at a speed greater than one rotation per minute, wherein the rotational member comprises a plurality of lights disposed thereon. The rotational member is selectively activated to rotate about the point of rotation. The lights are selectively activated when the rotational member is activated. And, when the rotational member and the lights are selectively activated, an image is displayed at the watch face, the image appearing as a three-dimensional image.

In still another embodiment, a display system has a watch having a watch face; and an intelligent display system disposed substantially adjacent the watch face. The display system includes a first display panel; a second display panel behind the first display panel; a memory having programming instructions thereon; and a controller in communication with the display panel and the selectively opaque panel, and the memory. The first display panel is configured to display a first piece of content. The second display panel is configured to display a second piece of content. The first piece of content and the second piece of content together form a complete content.

BRIEF DESCRIPTION OF THE SEVERAL VIEWS OF THE DRAWINGS

Illustrative embodiments of the disclosure are described in detail below with reference to the attached drawings.

DETAILED DESCRIPTION

Smart glass is known in the art. LCD displays have also been known for many decades. Timepieces, such as watches (e.g., analog, digital, pocket, wrist, wearable, etc.), are also known in the art. The disclosure relates in general to a multi-layered composite display that, in an embodiment, utilizes both smart glass and LCD display and/or other display technologies along with a wearable device. For instance, display technologies may employ hybrid embodiment combinations of transmissive, reflective, single-beam, multi-beam, holographic, and/or particle resonant mode particle displays (e.g. 3-D nanoparticles such as Carbon Nanotube [CNT], vibrational RGB/A emission resonance, graphene, micro-LED, organic LED, quantum LED, et cetera).

Smart glass, also referred to in the industry as privacy glass, switchable glass, intelligent glass, electric glass, etc., can change its tint, opacity, or shade upon the application of a stimulus. While smart glass can be made using many different types of technologies, suspended particle devices may be one popular type of smart glass. This disclosure, however, encompasses smart glass manufactured using any suitable technology, whether now known or subsequently developed. As is described in greater detail herein, smart glass particles can be excited (e.g., electrically) to selectively appear transparent, opaque or translucent (e.g., tinted) while becoming diffused when the excitation voltage is removed (or vice versa). Areas of a plane can be energized as a contiguous array of particles and controlled as a single panel of smart glass with a single AC voltage control signal excitation (or strategic excitation waveform). Multiple areas or segments can be seamlessly isolated to create a plurality of segment array elements allowing patterns of bars, blocks, icons, pixels, or discrete segments. A control grid or matrix of control signals can be configured as multiplexed rows and columns on opposing sides (or layered stacks) of the particle pane(s) to provide individualized control of the smart particle arrays. Optional multiplexed excitation control signals can be driven with strategically stepped waveform voltage levels over time in order to provide a differential signal to each particle segment area. A complex waveform may additionally encode multiplexed excitation control signals within a single composite complex waveform providing multiple drive signals for a plurality of display areas (e.g., modulated encoded analog or digital video signal).

Figure 1A:
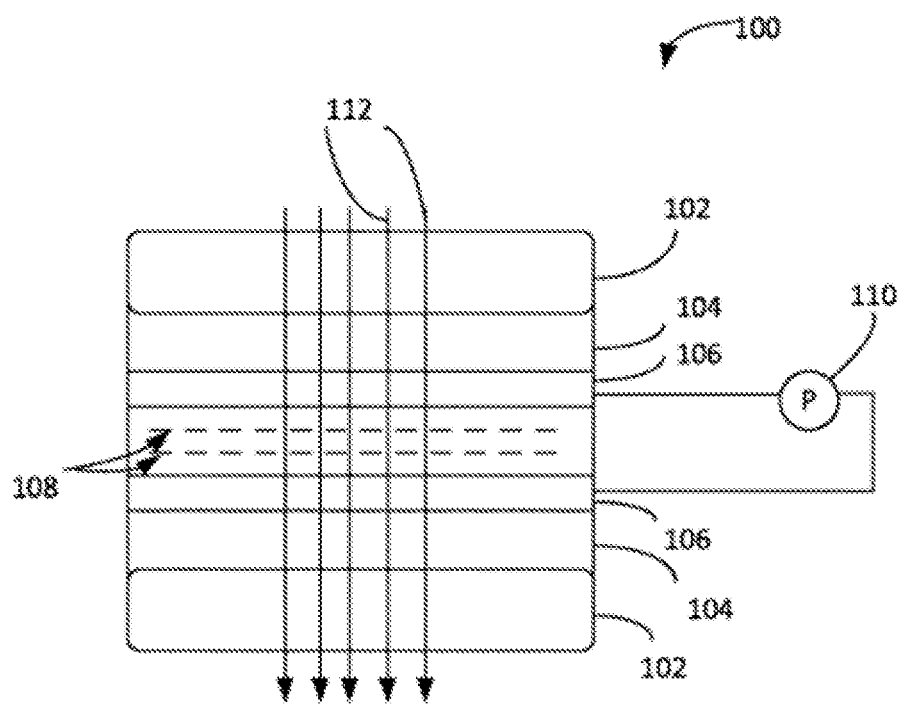
FIGS. 1A-1B are schematics illustrating the workings of a PRIOR ART smart glass panel.
Figure 1B:
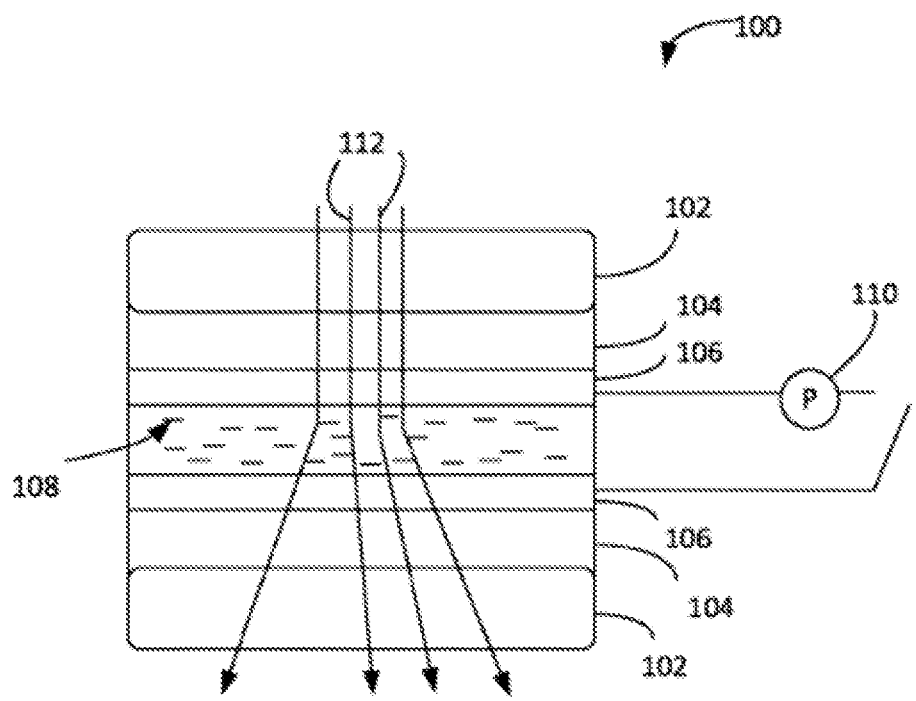

FIG. 1A schematically illustrates a suspended particle smart glass panel 100 as is known in the art. The panel 100 may include a glass layer 102, a polyethylene terephthalate (or PET) film 104, and a polymer layer 106 encasing crystalline particles (e.g., liquid crystal molecules) 108 in a carrier fluid. When an electric current is passed through the polymer layer 106 (e.g., via power source 110), as shown in FIG. 1A, the liquid crystal molecules 108 align in a substantially uniform pattern, thereby allowing light 112 to uniformly pass therethrough (which allows the panel 100 to be transparent or generally transparent). When the power source 110 is switched off (or otherwise disconnected, as shown in FIG. 1B), the liquid crystal molecules 108 orient randomly and diffuse or scatter the light 112, causing the glass panel 100 to become opaque (or generally obscured clarity). Those of skill in the art shall understand that the opposite may also be true. In other words, when the power source 110 is switched off, the liquid crystal molecules 108 may be aligned in a substantially uniform pattern, thereby allowing light 112 to uniformly pass therethrough. And when the power source 110 is switched on such that electric current passes through the polymer layer 106, the liquid crystal molecules 108 may randomly orient, to diffuse or scatter the light 112. Liquid crystal molecules may also be used in conjunction with polarization films to twist the angle of light to create the appearance of opacity or transparency to the observer. The function of apparent opacity or selective transparency is triggered by an excitation waveform and is dependent on the polarization angle between two planes or two surfaces of a single plane. The default mode with no power can become either transparent, opaque, tinted or blacked out. An example of a selective transparency LCD embodiment plane is a static driven twisted nematic (TN) fluid LCD construction similar to what has previously been used in calculator or gas pump fuel dispensing displays. Fixed position, rotating or moveable polarizers can be used to enhance the viewability and throughput of light apparent to the observer's perspective. For example, a rotating polarizer on one surface layer along with a fixed position polarizer on a separate layer can provide a linear gradient of tinting perception to the observer.

Figure 2:
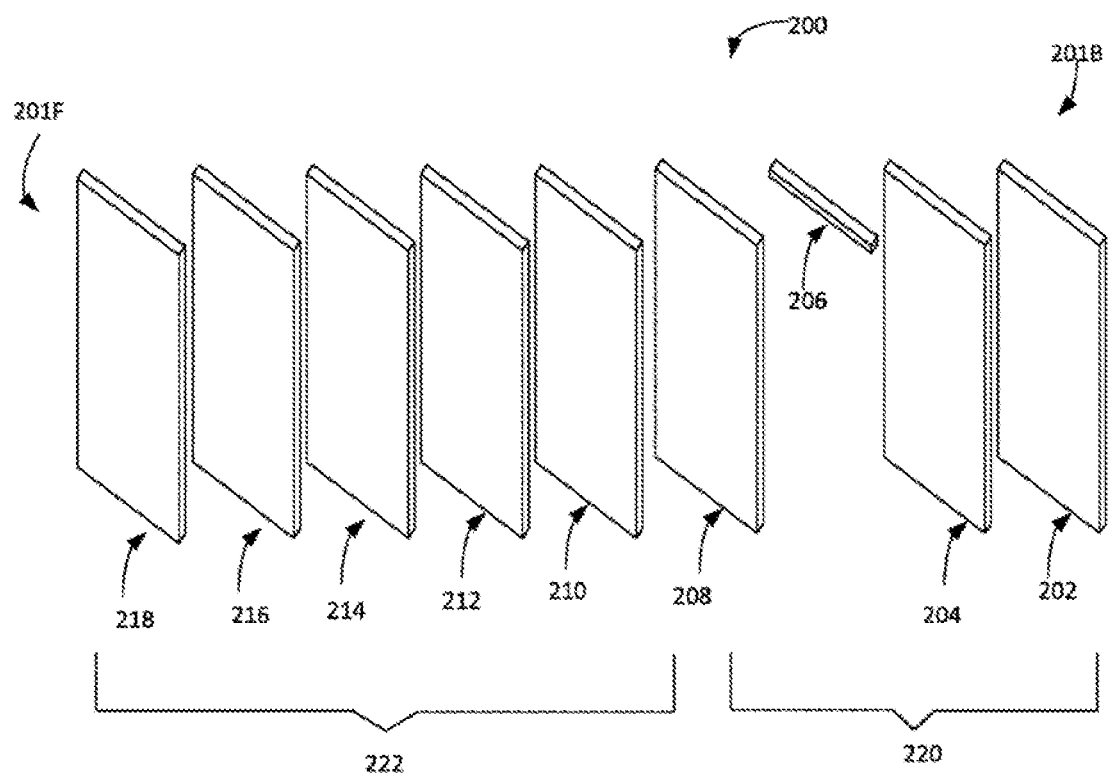
FIG. 2 is a schematic illustrating a PRIOR ART LED LCD display.

FIG. 2 schematically illustrates a traditional LCD display 200, such as a thin film transistor (TFT) LED LCD display. For purposes of discussion, the display 200 is described as a television display; however, it shall be understood by those of skill in the art that the display 200 may be a standalone layered display which may optionally form a part of many other devices, including but not limited to windows, mobile devices (e.g., smart phones, tablet computers, thermostats, security panels, kiosk displays, etc.) and other display devices.

Now that plasma displays may no longer be in vogue, LCD display technologies, and specifically the LED LCD displays (e.g., televisions) discussed herein, may dominate the market. The prior art LCD display 200 has a back side 201B, and a front side 201F from which a viewer views content displayed on the display 200. Going from the back side 201B to the front side 201F, the LED LCD display 200 includes a backing layer (e.g., the television cover's back) 202, a reflector 204, an LED panel 206, a diffuser 208, a first polarizer 210, a thin film transistor (TFT) glass panel 212, liquid crystals 214, a color filter glass panel 216, and a second polarizer 218. As is known, the first polarizer 210 and the second polarizer 218 may be oriented at ninety degrees to each other (e.g., the first polarizer 210 may be a horizontal polarizer and the second polarizer 218 may be a vertical polarizer). The LED panel 206 produces unpolarized light whose flow through the display 200 is controlled primarily by voltage applied to the liquid crystals 214 between the TFT glass panel 212 and the color filter glass panel 216. When no voltage is applied to the liquid crystals 214, the first polarizer 210 polarizes the light emanating from the light source 206. The liquid crystals 214 twist this polarized light to allow it to pass through the second polarizer 218 to the viewer. However, when voltage is applied to the molecules of the liquid crystal 214, they begin to untwist. This movement of the molecules of the liquid crystals 214 changes the angle of the light passing through the first polarizer 210 to the second polarizer 218. Depending on the voltage and waveform shape applied, at least part of the light gets blocked by the second polarizer 218 and makes the corresponding area of the LCD display 200 dark as compared to other areas. The liquid crystals 214 may not produce or emit light of their own.

For display of colored content, the LCD display 200 typically includes many pixels, each having three subpixels. Each subpixel includes red, green, blue (and sometimes amber) color filters, which are provided on the color filter glass panel 216. A liquid crystal cell is associated with each of the subpixels, and is energized or de-energized via transistors of the TFT glass panel 212 to block or transmit light. Through careful control and variation of the applied voltage, coupled with knowledge of human perception (e.g., knowledge of the human eye "rods", "cones" and persistence of vision), the intensity of each subpixel is manipulated so as to collectively cause the pixel to appear a particular intensity and color, including colors other than red, green, and blue (e.g., amber). Content is displayed on the LCD display 200 by this modulation of light emanating from the LED panel 206.

In some prior art LCD displays, the length and height of the LED panel 206 may be approximately equal to the length and height of the display 200. Other LCD displays, such as the LCD display 200, may be edge-lit. That is, the LED panel 206 may, as shown, be provided at an edge (e.g., the upper edge) of the LCD display 200. The diffuser 208 may diffuse (e.g., scatter) the light emanated by the LED panel 206 to enable even irradiation thereof; thus, when the LED panel 206 is powered, a user adjacent and facing the diffuser 208 sees a generally white (or other) background. The reflector 204 is an optical element used to reflect the light from the LED source 206 to allow for effective utilization of the light. The diffuser 208, the LED source 206, the reflector 204, and the back cover 202 of the display 200 may collectively be referred to by the artisan as a backlight unit 220 of the LCD display 200. The artisan may collectively refer to the first polarizer 210, the thin film transistor (TFT) glass panel 212, liquid crystals 214, the color filter glass panel 216, and the second polarizer 218 as an LCD panel 222 of the LCD display 200. When the LCD display 200 is in use, a majority of the power supplied to the display 200 (e.g., via a conventional 110/220V outlet) may be used by the backlight unit 220.

The artisan understands that one LCD display may twist the light passing through the liquid crystals differently (e.g. in different selected areas and angles over time) as compared to another LCD display to effect contrast and coloration. Twisted Nematic (TN) LCDs, for example, typically have a twist of 90 degrees or less. High Twisted Nematic (HTN) LCDs are generally based on a higher twist (usually about 110 degrees) and may therefore offer wider viewing angles and improved contrast as compared to TN LCDs. Super Twisted Nematic (STN) LCDs have a twist that is greater than 90 degrees and less than 360 degrees (and is typically between 180 and 270 degrees). Accordingly, it shall be understood that the twist may take a variety of different angles and X/Y positions based on the desirable outcome. The artisan will thus appreciate that the LCD display 200, including the backlight unit 220 and the LCD panel 222 thereof, is merely one example of a type of LCD display in use today. The present disclosure encompasses any LCD display technology now known or subsequently developed.

Organic LED (OLED) displays are also known in the art. One key difference between the LED LCD displays and the OLED displays is that the OLED display pixels, unlike the LCD display pixels, provide their own illumination. It is important to note that due to the transmissive nature of LEDs and OLEDs it is difficult to produce a reliable and consistent color reference as the color black. A background color of black is typically used with LEDs to overcome this limitation. In contrast, LCD displays have a typical limitation to produce a color of white. A backlight of white is typically used with LCDs to overcome this limitation. This brings a challenge to designing a mutiplanar or multilayered design with any of these existing technologies. It may be desired to provide variations in white balancing over an area of the display and provide selective highlights of de-emphasized or pre-emphasized white levels per pixel (or segmented areas). White balanced backlight level changes may be integrated or differentiated based on display image data and vary in white level intensities over time. The inverse of these techniques may be used to modulate and manage black level balancing on display technologies such as transparent OLED displays.

While the various technologies discussed above (e.g., smart glass technology, LCD display technology, OLED technology, etc.) continue to progress at a rapid rate, they generally do so on independent paths. There is very little, if any, consolidation of these technologies in a unitary display. For instance, there is no unitary display in the market that includes both an LCD display panel and an OLED display panel. Similarly, there is no LCD display panel or OLED display panel that employs, for example, smart glass selective transparency technology. The present disclosure is directed to a mixed-mode composite display utilizing two or more disparate technologies (e.g., employs LCD display technology in addition to OLED display technology, employs LED LCD display technology in addition to smart glass technology, multiple layers combining optically transmissive, reflective, or altering properties, etc.). The disclosure may refer to this display as an "intelligent glass" display.

The term "intelligent glass," as used herein, refers to a single or multi-layered panel that is configured to receive an input and can provide a controlled output in response. The input may be, for example, vibration, voltage, light, heat, sound, haptics, data, biometrics, or some other contact or non-contact stimulus. The response may be, for example, a change in the aesthetic appearance of the intelligent glass, or another response such as an alert generation. The intelligent glass display may include, for example, one or more of smart glass displays, one or more organic LED (OLED) displays, one or more micro-LED displays, one or more LCD displays, one or more liquid crystal on silicon (LCOS) displays, or any other such single or multi-layered panel that can provide a controlled output in response to a stimulus. In embodiments, the intelligent glass display may comprise conventional glass having one or more sensors disposed thereon and/or embedded therein. As noted, in embodiments where the intelligent glass display comprises multiple layers, one layer may employ technology disparate from the technology employed by another layer (e.g., the intelligent glass display, in an embodiment, may include a layer comprising smart glass and another layer comprising an OLED display). In embodiments, and as discussed herein, substances and/or objects (e.g., semi-conductor crystals, polarizers, etc.) may be disposed between the layers comprising the intelligent glass display. In other embodiments, multiple layers of the same technologies may be used to provide revealing view portals to other physical and virtual images (e.g., an analog watch that is obscured with a digital watch selectively viewable to the observer).

Figure 3A:
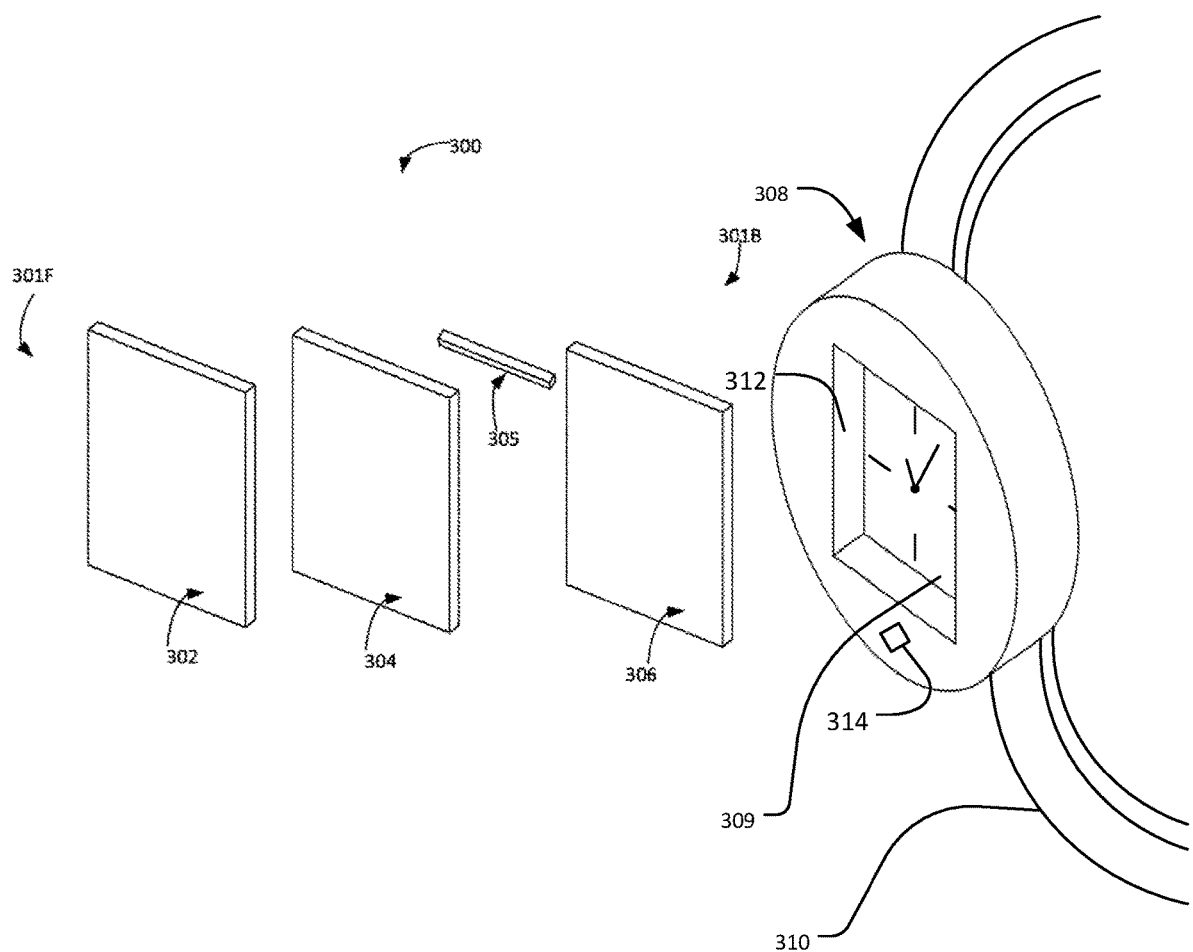
FIG. 3A is a schematic illustrating a watch with an intelligent glass display, according to an embodiment of the disclosure.
Figure 3B:
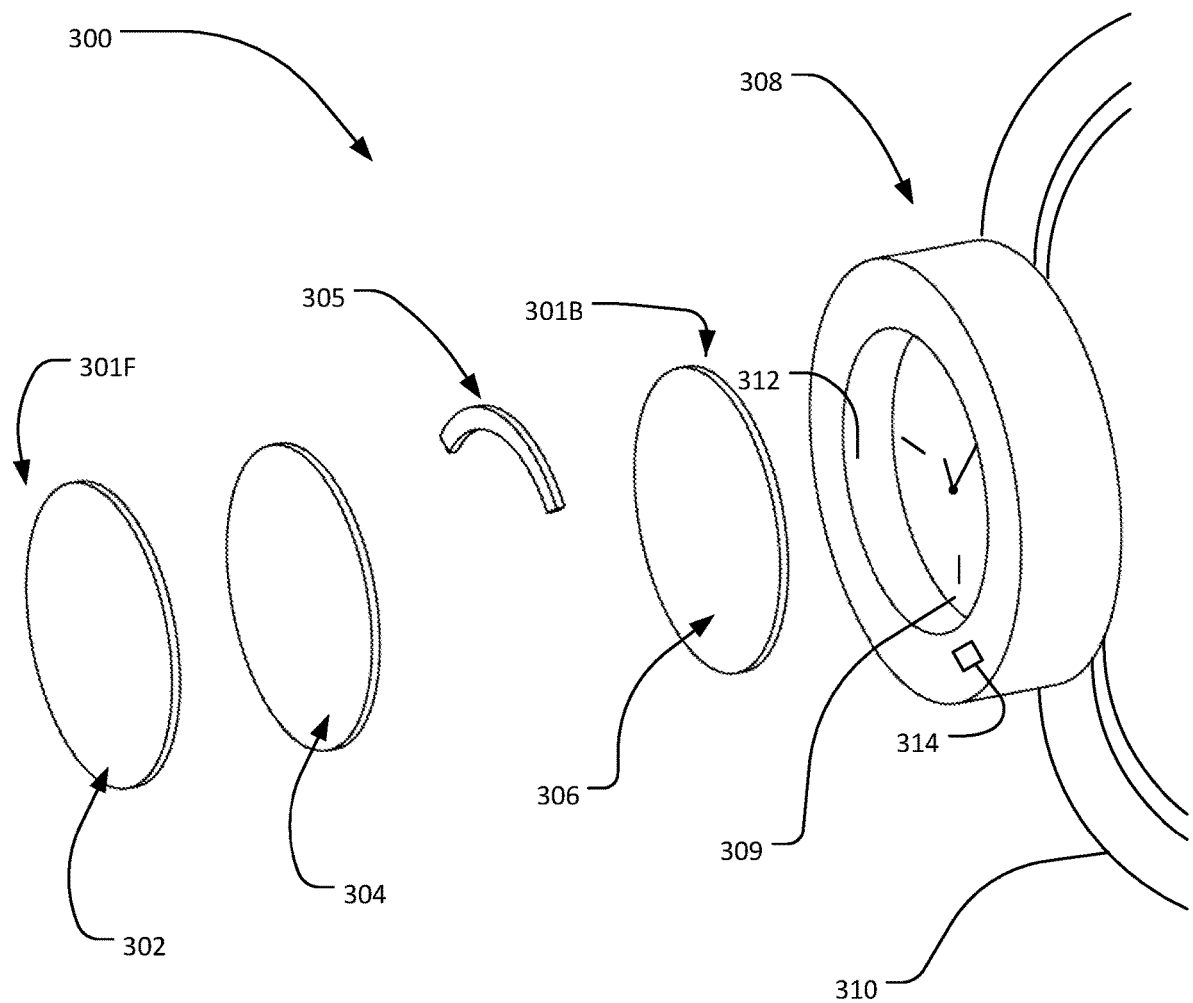
FIG. 3B is a schematic illustrating the watch with the intelligent glass display, according to another embodiment of the disclosure.

Focus is directed now to FIGS. 3A and 3B, which show an intelligent glass display watch 300 according to example embodiments. The intelligent glass watch 300 may have a front side 301F from which a viewer may view content displayed on the watch 300. The watch 300 may, in an embodiment, comprise a first (or front) layer 302, a second layer 304, an LED panel 305, and a third (or back) layer 306, all of which may be set on and/or within a watch body 308, disposed upwardly adjacent a watch face 309. In embodiments, the respective layers 302, 304, 305, and 306 may be disposed substantially adjacent the watch face 309 itself The transparency, opacity or obscurity of each layer 302, 304, and 306, and/or the polarization thereof (including each surface of each layer) may, in embodiments, be selective (e.g., programmable, adjustable, et cetera) such that the user may selectively view the watch face 309. The watch 300 may be wearable, for example, by having a retention device 310 (e.g., straps, chains, et cetera).

The watch body 308 and watch face 309 may include any suitable watch technology, power source, or display type now known or subsequently developed. For example, the watch body 308/watch face 309 may have an analog, digital, or analog/digital hybrid display, with a quartz, mechanical, battery, Peltier, vibration, automatic, kinetic, atomic, fuel cell, rechargeable, and/or solar power source. The power source may also provide a functional time base reference for maintaining accurate time between settings. The watch 300 may have any suitable type of timepiece configuration now known or subsequently developed, such as a wristwatch or pocket watch configuration. In embodiments, hybridization of mechanical, electrical, optical, chemical, and/or transducer technologies may combine energy storage, energy harvesting, and other forms of accessible energy to be used as a power source for the watch body 308 as a system (e.g., mechanical, solar, Peltier thermal, electromagnetic, radio frequency, battery, piezo vibration, et cetera).

While the intelligent glass watch 300 is shown as having three layers 302, 304, and 306, such is merely exemplary. Any number of layers (e.g., two, five, ten, etc.) may be incorporated in the intelligent watch 300 so long as one layer employs technology different from the technology employed by another layer (e.g., one layer employs LCD display technology and another layer employs OLED, LCOS, smart glass, and/or another technology now known or subsequently developed). Variations in construction of multiple layers may additionally allow embodiments to utilize different modes of operation between layers of the same basic technology (e.g., TFT-LCD as a display along with TN-LCD as a selective transparency or selective obscurity layer). Further, while FIG. 3A shows the layers 302, 304, and 306 as being generally rectangular, the artisan will appreciate that these layers 302, 304 and 306 may take on any regular or irregular shape and need not be planar. For example, the layers 302, 304, and 306 may have a generally circular shape, as shown in FIG. 3B.

The watch 300 may include one or more processors or other controllers (e.g. communication modules) and memory having programming instructions stored thereon, as will be described in detail below. The programming instructions may cause the watch 300 to operate or at least facilitate operation of the watch 300 as set forth herein. In embodiments, a networking device may be provided to allow the watch 300 to communicate with electronic devices (e.g., with smart phones, other displays, etc.) over wired or wireless networks (e.g., Bluetooth, Wi-Fi, cellular, 5G, IRDA, VLC, or other networks). In some embodiments, the watch 300 may be coupled to a content provider (e.g., to Netflix, cable, satellite, Amazon Prime, etc.) and/or a central processing unit to allow the watch 300 to selectively emulate the functionality of a traditional television display, smart phone, and/or a computer. For example, the watch 300 may include components configured to perform functions such as: phone/video calling, texting, streaming videos, taking photos/videos, internet browsing, playing music, hosting mobile phone applications, et cetera.

In embodiments, an LED (or other suitable light source) panel 305 may be provided at an edge of the watch 300 in front of the third layer 306 (or another layer). Embodiments where multiple LED panels 305 are provided are also contemplated. The LED panel 305 may be situated behind the second layer 304 as shown, or elsewhere (e.g., behind or in front of the first layer 302). In embodiments, each of the first layer 302 and the second layer 304 may have an LED panel 305 associated therewith. In some embodiments, some layers may utilize an optically transmissive layer such as electroluminescent (EL) film or traditional LED to avoid edge lighting.

The first layer 302 may, in an embodiment, be an LCD panel. For example, the first layer 302 may be the LCD panel 222 of FIG. 2, or a differently configured LCD panel. The artisan will understand, however, that the provision of an LCD panel as the first layer is merely exemplary; in other embodiments, the first layer 302 may be an OLED display panel, or another display panel.

The first layer 302 may, in whole or in part, be selectively transparent (i.e., all or part of the first layer 302 may be caused to transmit light therethrough like a traditional viewing window), but may have robust functionality. In embodiments, an image may be selectively displayed on one or more portions of the first layer 302, and another portion or portion(s) of the first layer 302 may appear transparent to the viewer. One or more contact or non-contact sensors (e.g., camera/CMOS sensors for object detection, infrared sensors for proximity, presence, and/or gesture detection, acoustic sensors for voice recognition, biometric sensors for user verification, oxygen and carbon monoxide sensors for environment monitoring, doppler blood pressure sensing, GPS sensors for positional determination, finger print authentication, forehead body temperature, olfactory, electroencephalogram (EEG), electrocardiogram (EKG), bacterial, viral lab on a chip, reflective projection, spectroscopy, etc.), whether now known or subsequently developed, may be disposed on, embedded within, and/or provided proximate the first layer 302 (and one or more of the other layers). In some embodiments, the first layer 302 may be configured to display content (e.g., images, videos, information, text, etc.) projected thereon. For example, the watch 300 may include a projector 314 for displaying content on the first layer 302. In embodiments where the watch 300 is configured for the display of colored content, color filters may be included on at least a part of the first layer 302 (and/or the other layers).

The first layer 302 may, but need not be, touch-controlled. For example, a touch screen user interface may be displayed on the first layer 302 to allow a user to control operation of the watch 300. The touch interface may include a touch keyboard, icons, and/or other controls to allow a user to configure the watch 300 for a particular application. In embodiments, the touch interface may be configured to receive input signals (or "impacts") from humans, animals, organisms, or other energy types. Traditional touch screen films may be used, as well as polymer sensing coatings that can operate as a bacterial or other biosensor lab-on-a-chip surface sensor, or combinations thereof. For example, a neurological impulse from a transduced and coupled pulse stream through human skin may provide a recognizable impact to send or receive a text message by simply thinking an action as a controlled event.

In embodiments, the interface for display on the first layer 302 may additionally or alternately be gesture controlled. The skilled artisan understands that gesture control devices, known in the art, recognize and interpret movements of the human body in order to interact with and control a computing system without physical contact. For example, in an embodiment, a viewer may wave at the first layer 302 to cause the watch 300 to display content and wink at the first layer 302 to cause the watch 300 to become transparent. While gesture control may be incorporated in the intelligent watch 300 by any means now known or subsequently developed, in an embodiment, infrared gesture sensors disposed on or proximate the first layer 302 may be used to allow the intelligent watch 300 to detect movement of a viewer proximate the watch 300. Gesture movements may be observed from a remote fixed point reference monitoring device or the monitoring device may follow the movements of the user by being physically fixed thereto. For example, another wearable device may be worn by the user to allow a camera or other fixed gesture viewing scanner to have a constant relevant perspective of viewing angle and focal length to the gesture movements of the user. Additionally, information may be projected or otherwise displayed (e.g., on a multilayered glass) which may be incorporated into the wearable device. The information can assist in dynamically prompting the user for gestures, and may even act as a bio-feedback closed loop establishing a natural use mode of operation. It is important to note that gestures may be interactive with users, animals, devices, or other objects including encoded datagrams (e.g., graphically encoded icon (GEI) or composite waveform analysis such as olfactory forecasting). Gestures may be generated by any intentional movement or signal that is intentionally alterable and discernable as an "impact" input.

Additionally, or alternatively, the interface may, in embodiments, be a voice-user interface (VUI), haptic response, voice response, and projected user displays including holograms. Voice is not limited to phonetic waveforms and can be any decodable utterance or contiguous energy pattern. For example, the watch 300 may have speech recognition capability to enable a user to operate the watch 300 in a hands-free manner. In some embodiments, the interface may respond to the voice of only authorized users. In other embodiments, the user may be able to, for example, snap his fingers and/or clap to cause the watch 300 to power on or off or to cause the watch 300 to switch from one mode (discussed below) to another.

The second layer 304, akin to the first layer 302, may be an LCD panel. Like the first layer 302, the second layer 304 may be selectively transparent (e.g., an image may be displayed on part of the second layer 304 whereas another part of the second layer 304 may appear transparent to the user; or, the entire second layer 304 may be configured so as to appear transparent to the user, et cetera). While the second layer 304, in this example, is an LCD panel, the artisan will appreciate that in other embodiments, the second layer 304 may be an OLED panel, a different display panel, a smart glass panel, et cetera. The second layer 304 may, in embodiments, include an interface as discussed above for the first layer 302 (e.g., a gesture controlled interface, a touch controlled interface, a voice controlled interface, distributed network interface, et cetera). One or more contact and/or non-contact sensors may be disposed on, embedded within, and/or provided proximate the second layer 304. In embodiments, a mechanical moving assembly such as a spinning bar with LEDs may be contained between display panel layers to create a selectively intriguing three-dimensional (3D) effect for the user.

The third layer 306 may, in an embodiment, be smart glass (i.e., traditional privacy glass). That is, the third layer 306 may selectively be made opaque (e.g., white, black, gray, blue, frosted, obscured, etc.) or transparent (e.g., light may be allowed to selectively pass through a part of the third layer 306). In some embodiments, the third layer 306 may be configured for the projection of content thereon. As discussed herein, when the third layer 306 is made transparent along with the first layer 302 and the second layer 304, a user may be able to see the watch face 309 (i.e., through each of the first layer 302, second layer 304, and third layer 306) much like through a traditional viewing window. In some embodiments, a fourth layer may also be provided behind the third layer 306. The fourth layer may comprise, for example, smart glass, and may be made selectively opaque to ensure that an image projected on the third layer 306 is not viewable from behind the watch 300. It shall be understood that "smart glass" as used herein includes glass, or any other selectively transparent substrate including but not limited to clear plastics, acrylic, polycarbonate, Mylar®, Kapton®, and the like.

In some embodiments, the second layer 304 may be omitted, and the watch 300 may have a first layer 302 comprising an LCD panel (or another display panel) and another layer comprising smart glass. In these embodiments, the LED panel 305 may be disposed behind the first layer 302 and in front of the smart glass layer.

Importantly, in an embodiment, the example intelligent glass watch 300 may be devoid of a traditional reflector and a diffuser, which are typically employed with LED LCD displays. More specifically, where light outside the watch 300 (e.g., such as ambient light, light from light fixtures in the room, etc.) is available, the watch 300 may employ this light for use in the watch 300 instead of the LED panel 305. Where the watch 300 determines (e.g., via a computing system 330, see FIG. 5) that there is no appreciable light outside the watch 300, the watch 300 may then power on the LED panel 305 and employ light from the LED panel 305 (e.g., angularly projected light) for use in the watch 300. Light available for use in the intelligent glass watch 300 generated by any source other than the LED panel 305 associated with the watch 300 may be referred to herein as ambient light. In embodiments, the watch 300 may simultaneously utilize ambient light and light from the LED light panel 305 for the display of content. In some embodiments, the watch body 308 and/or watch face 309 may have lights to provide ambient light.

The third layer 306, like the other layers 302 and/or 304, may have sensors disposed thereon or embedded therein. For example, the third layer 306 may include sensors (e.g., photodiodes, phototransistors, photoresistors, cadmium-sulfide (CDS) cells, hue detectors, etc.) to detect the amount of ambient light available for use in the watch 300. Where these sensors indicate that there is sufficient ambient light, the watch 300 may employ the ambient light instead of light from the LED panel 305 for use in the watch 300. Alternately, where these sensors indicate that the ambient light is insufficient (e.g., at night time and/or where the watch 300 is situated in a dark room), the display may utilize the light from the LED panel 305 for the display of content. In some embodiments, light from the LED panel 305 may be utilized and all or part of the smart glass layer 306 may be used to reflect the light akin to a traditional reflector.

In embodiments, the watch 300 may be operable in each of: (a) a display mode in which content for viewer consumption (e.g., a movie, an interface, or any other content) is displayed on only one of the layers 302, 304 and/or 306; (b) a multilayer display mode in which content for viewer consumption is displayed on two or more layers (e.g., on each of layers 302 and 304); (c) a transparent mode in which each of the layers 302, 304, and 306 appear transparent to the viewer (i.e., the user can see through the layers 302, 304, and 306 much like through a traditional viewing window); and (d) a privacy mode in which at least one of the layers 302, 304, and 306 is opaque such that the watch face 309 is obscured from view. The watch 300 may be configured such that in each of the display mode and the multilayer display mode, one or more portions of the watch 300 (e.g., portions of the first layer 302, the second layer 304, and/or the third layer 306) appear transparent to the user whereas another portion or portions of the watch 300 display certain content for user consumption.

In some embodiments, in the multilayer display mode, each of the first layer 302 and the second layer 304 (or two or more other layers comprising the watch 300) may be configured to collectively display cohesive blended content. For example, the head of a bird may be displayed on the first layer 302 and its body may be displayed on the second layer 304 to give the image a three dimensional effect. In these embodiments, the location of the viewer proximate the watch 300 may be determined (e.g., via sensors disposed on or proximate the first layer 302) so that content can be blended by taking into account the relative location of the viewer with respect to the watch 300. Determining viewable perspectives can allow the system to create an appearance of surface "presence mode" content being displayed simultaneously as "depth mode" content. So, as the viewer moves (e.g., moves his or her head or entire body), the depth mode content may appear to move while the presence mode content may appear to be stable in its original location.

The watch 300 may, in embodiments, be an augmented reality display. The artisan understands that augmented reality is the integration of digital information with a user's environment in real time. Augmented reality is different from virtual reality, where the entire environment is virtual. The watch 300 may use the existing environment and overlay (e.g., via projectors 314) information on top of the existing environment. The watch 300 may be employed in any environment where it is beneficial to overlay digital information on the user's actual environment. The vectored relationship between the user and the watch 300 may be tracked in real-time and used to calculate the imagery displayed on the multiple layers of display content. For example, the watch 300 may be configured to project images and/or information upon environmental objects proximate the user, such as the watch face 309 or other nearby surfaces. As another example, the watch 300 may be able to provide feedback (e.g., analysis, data, statistics, etc.) to the user in response to a user action, user environment, and/or user condition detected by the watch 300 (e.g., via a sensor). Augmented reality perspectives may also include variations of traditional mixed-mode reality perspectives. For example, multiple observers may experience different perspectives of viewability and content awareness based on angle, distance and movements over time. The image data content presented may be dynamically altered and controlled in an effort to provide multiple augmented perspectives to multiple observers. It is important to note that observers may be humans, animals or devices such as autonomous robotic machines.

In embodiments, one or more of the layers 302, 304, and 306 may be configured to display segmented content (i.e., a portion of a layer 302, 304, or 306 may display different content from another portion of the same layer 302, 304, or 306). For example, a portion of a layer 302, 304, or 306 that is upwardly adjacent a perimeter area of the watch face 309 may display content (e.g., an image, an aesthetic design, a video, etc.), while another portion of the same layer may be transparent. In effect, the user may have an unobstructed view of the watch face 309 while content is simultaneously shown over a perimeter area of the watch face 309.

Figure 4:
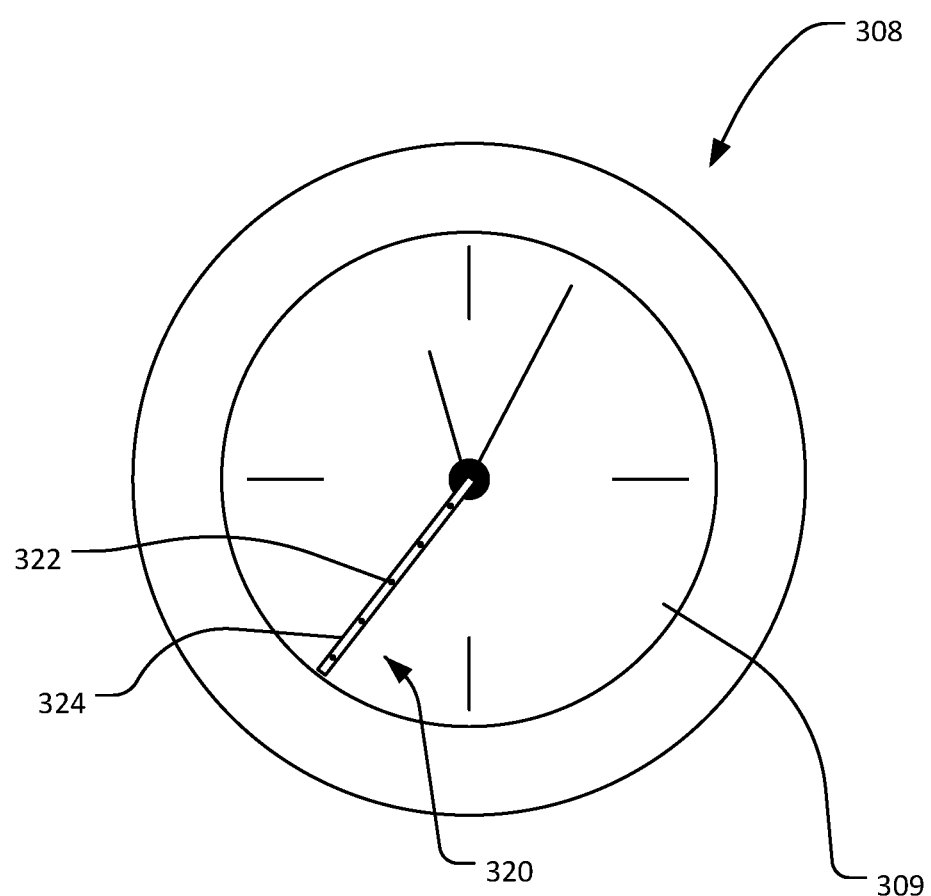
FIG. 4 is a front view of a rotating arm of the watch, according to yet another embodiment of the disclosure.

In some embodiments, the watch 300 may include a lighted arm 320, as seen in FIG. 4. The lighted arm 320 may have lights 322 mounted on and/or within a bar 324, and may be configured to spin (e.g., at a high speed), while the lights 322 (e.g., any suitable light source such as LEDs) are selectively activated (e.g., flash on/off, turn different colors, etc.) in a pattern. This combination of rotating and flashing the lights 322 may create the appearance of an image (e.g., two-dimensional, three-dimensional) or series of images (e.g., a hologram) to the human eye. The lighted arm 320 may dynamically change the pattern displayed based upon user inputs in the user interface, instructions from the computing system 330, or any other suitable instruction source (e.g., instructions communicated from a remote source). The rotating lighted arm 320 and the flashing light pattern may combine to create a type of display for the user to view. In other embodiments, the watch 300 may be used on other areas of the body besides the arm for monitoring analysis and alert response indication (e.g., ankle mounts for haptic calendar alerts, under arm mounts for temperature/blood pressure monitoring, headband mounts for pineal eye therapy and thermal comfort, et cetera).

In some embodiments, the watch 300 may include means for displaying information away from the watch 300. For example, the watch 300 may include a projector 314 which may be used to project images away from the watch 300, such as a keyboard or other image. The wearer of the watch 300 may interact with the display to influence operation of the watch 300. In embodiments, a sensor such as a camera detects the wearer's interaction with the display, in order to provide a response (e.g., a response via the watch 300).

In some embodiments, the watch 300 may include a damping substance 312. For example, the watch 300 may have a damping adhesive disposed on and/or around the layers 302, 304, and 306, such as those disclosed in U.S. Pat. Nos. 9,759,286 and 10,088,011, herein incorporated by reference in their entireties. The damping substance may help mitigate some or all of the detrimental influence of impact forces upon the function of the watch 300. For example, the watch 300 may have a mechanical watch type construction, which typically consists of an intricate and delicate gear system. An unmitigated force exerted on the gear system may damage the system, resulting in some obstruction of functionality. Including a damping substance in the construction of the watch 300 may assist in avoiding such an undesirable outcome. For example, embodiments of the watch 300 including the rotating arm 320 may find it preferable to use the dampening substance to mitigate some or all of the forces exerted by the movement of the rotating arm 320 on the watch 300.

Figure 5:
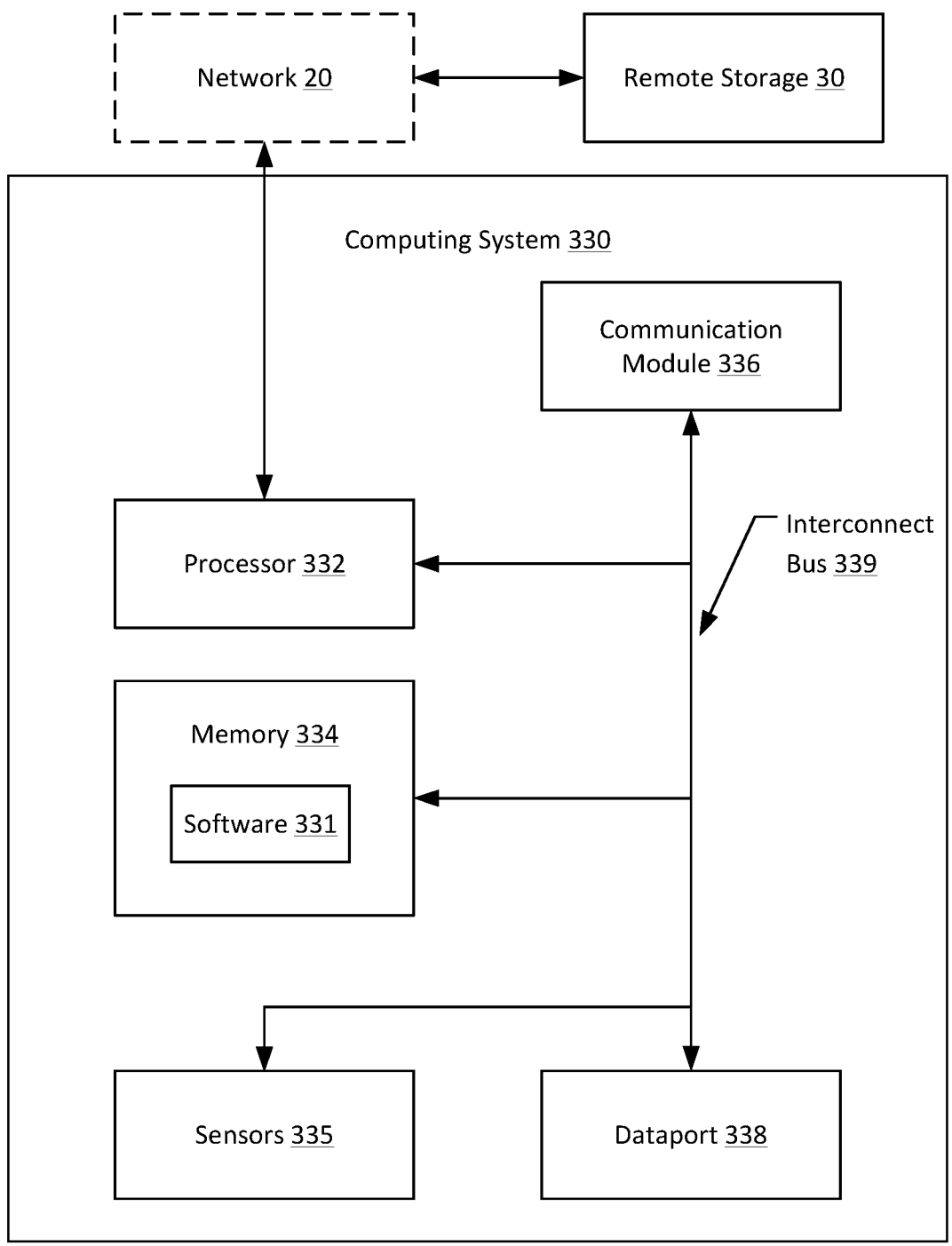
FIG. 5 is a functional block diagram depicting a computing system for use with the various embodiments of the disclosure.

FIG. 5 is a functional block diagram of the computing system 330 which may be used to implement the intelligent glass display watch system embodiments according to the different aspects of the disclosure. The computing system 330 may be, for example a flexible circuit board or other computing device whether now known or subsequently developed. The computing system 330 may include a processor 332, memory 334, a sensor 335, a communication module 336, and a dataport 338. These components may be communicatively coupled together by an interconnect bus 339. The processor 332 may include any processor used in smartphones and/or other computing devices, including an analog processor (e.g., a nanocarbon-based processor). In certain embodiments, the processor 332 may include one or more other processors, such as one or more microprocessors, and/or one or more supplementary co-processors, such as math co-processors. In operation, the processor 332 may direct components of the watch 300 in performing the functions disclosed herein.

The memory 334 may include both operating memory, such as random access memory (RAM), as well as data storage, such as read-only memory (ROM), hard drives, optical, flash memory, or any other suitable memory/storage element. The memory 334 may include removable memory elements, such as a CompactFlash card, a MultiMediaCard (MMC), and/or a Secure Digital (SD) card. In certain embodiments, the memory 334 includes a combination of magnetic, optical, and/or semiconductor memory, and may include, for example, RAM, ROM, flash drive, and/or a hard disk or drive. The processor 332 and the memory 334 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 332 may be connected to the memory 334 via the dataport 338.

The computing system 330 may have one or more sensors 335 that may be any suitable type of sensor now known or subsequently developed. For example, the sensors 335 may be an optical sensor (e.g., a camera), an audio sensor (e.g., a microphone), a force sensor (e.g., accelerometer), a touch sensor (e.g., infrared grid, capacitive, infrared acrylic projection, acoustic pulse recognition, etc.), a biosensor (e.g., a fingerprint detector), or a combination of suitable sensors. The sensors 335 may be on and/or within the watch body 308 (e.g., in, on, and/or around the layers 302, 304, and 306). In operation, the computing system 330 may use the sensors 335 to gather user and/or environmental information. As one example, the sensors 335 may include audio and video reception components to facilitate user phone calls, picture taking, sound recording, and/or video calls. As another example, the sensors 335 may include touch and/or biosensors for a user interface, such as an optical fingerprint recognition sensor. The user interface may allow the user to provide authentication (e.g., a password, passcode, fingerprint, eye scan, or any other suitable authentication method), manipulate the watch face 309 function, browse the internet, send/receive messages and calls, et cetera. As yet another example, the sensors 335 may include biosensors capable of monitoring the user and/or others, such as a body temperature meter, heart rate/pulse monitor, calorie counter, step counter, blood glucose meter, microorganism detector, et cetera. In use, biosensors may allow the user to monitor the health of an individual.

In some embodiments, one or more layers 302, 304 and 306 may communicate to the user one or more readings taken by the sensors 335, such as by displaying the reading on one or more of the layers 302, 304, and 306, alerting the user via sound and/or text notification, et cetera.

The communication module 336 may be configured to handle communication links between the computing system 330 and other external devices or receivers and to route incoming/outgoing data appropriately. For example, inbound data from the dataport 338 may be routed through the communication module 336 before being directed to the processor 332, and outbound data from the processor 332 may be routed through the communication module 336 before being directed to the dataport 338. The communication module 336 may include one or more transceiver modules configured for transmitting and receiving data, and using, for example, one or more protocols and/or technologies, such as Bluetooth BLE, GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology. In embodiments, the communication module 336 may communicatively link the watch 300 with other phones, computers, devices, and/or the internet. For example, the communication module 336 may facilitate phone and/or video calls, control other devices (e.g., screen sharing with and/or remote controlling another device), et cetera. In embodiments, the communication module 336 may facilitate smart phone-like device function.

In embodiments, the computing system 330 may communicate a reading from the sensors 335 via the communications module 336. For example, the sensors 335 may include a heartbeat/pulse sensor for discerning a user's heartbeat, and the reading taken may be communicated, via the communication module 336, to a remote database for the user's review. As another example, the sensors 335 may detect a user condition that requires medical attention, and the communications module 336 may be directed to generate a corresponding alert (e.g., an emergency services call, an audible alert, a notification to an emergency contact, et cetera).

The dataport 338 may be any type of connector used for physically interfacing with a smartphone, computer, and/or other devices, such as a mini-USB/USB port or an IPHONE®/IPOD® 30-pin connector or LIGHTNING® connector. In other embodiments, the dataport 338 may include multiple communication channels for simultaneous communication with, for example, other processors, servers, and/or client terminals.

The memory 334 may store instructions for communicating with other systems, such as a computer. The memory 334 may store, for example, a program (e.g., computer program code) adapted to direct the processor 332 in accordance with the embodiments described herein. The instructions also may include program elements, such as an operating system. While execution of sequences of instructions in the program causes the processor 332 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 334 includes software 331. The software 331 may contain machine-readable instructions (e.g., a mobile phone application) configured to be executed by the processor 332. The software 331 may, for example, process user inputs to the computing system 330. In embodiments, the software 331 may cause the computing system 330 to dynamically respond to a signal, such as a user input or a sensor 335 detection. For example, the software 331 may have the computing system 330 modify the function of the rotating arm 320 based upon a received data signal. As another example, the software 331 may modify the content displayed on one or more of the layers 302, 304, and 306 in response to a sensor 335 detection and/or a user input.

The computing system 330 may be in data communication with a remote storage 30 over a network 20. The network 20 may be a wired network, a wireless network, or comprise elements of both. The remote storage 30 may be, for example, the "cloud" or other remote storage in communication with other computing systems. In embodiments, data (e.g., lights 323 color and flashing patterns, user information, a user account, etc.) may be stored in the remote storage 30 for use thereof.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

The invention claimed is:

1. A display system, comprising:
   a watch having a watch face and a rotational member configured to spin about a point of rotation at a speed greater than 1 rotation per minute, wherein the rotational member comprises a plurality of lights thereon, and wherein the lights are actuated when the rotational member is actuated to spin about the point of rotation to result in a holographic image; and
   an intelligent display system disposed substantially adjacent the watch face, the display system comprising:
   a display panel;
   a selectively opaque panel disposed behind the display panel;
   a memory having programming instructions thereon; and
   a controller in communication with the display panel and the selectively opaque panel, and the memory;
   wherein the display system is operable in each of:
      a) a display mode wherein the display panel is actuated by the controller to display image content, and at least a portion of the selectively opaque panel is opaque;
      b) a transparent mode wherein the display panel does not display image content, the selectively opaque panel is substantially transparent, and the watch face is substantially visible; and c) an augmented reality mode wherein the display panel is actuated by the controller to display image content, and the selectively opaque panel is substantially transparent, the watch face being substantially visible behind the display system.

2. The system of claim 1, wherein the rotational member is actuated when the display system is in the transparent mode.

3. The system of claim 1, further comprising a damping substance located at a perimeter of the display panel and a perimeter of the selectively opaque panel.

4. The system of claim 1, further comprising a projector.

5. The system of claim 4, wherein the projector is configured to project content on one of the display panel and the selectively opaque panel.

6. The system of claim 4, wherein the projector is configured to project content on a surface remote to the watch.

7. The system of claim 1, further comprising a sensor configured to detect a characteristic of a user.

8. The system of claim 7, wherein the sensor is selected from the list consisting of: a camera, an infrared sensor, an acoustic sensor, a biometric sensor, an environmental sensor, and a GPS device.

9. A display system, comprising:
a watch comprising a watch face and a rotational member configured to rotate about a point of rotation at a speed greater than one rotation per minute, wherein the rotational member comprises a plurality of lights disposed thereon; and
wherein:
the rotational member is selectively activated to rotate about the point of rotation;
the lights are selectively activated when the rotational member is activated; and
when the rotational member and the lights are selectively activated, an image is displayed at the watch face, the image appearing as a three-dimensional image.

10. The display system of claim 9, wherein the rotational member is disposed behind the watch face.

11. The display system of claim 9, further comprising a sensor configured to detect a user input.

12. The display system of claim 9, further comprising an audio receiving and an audio emitting portion.

13. The system of claim 9, further comprising a projector.

14. The system of claim 13, wherein the projector is configured to project content on one of the display panel and the selectively opaque panel.

15. The system of claim 13, wherein the projector is configured to project content on a surface remote to the watch.

16. A display system, comprising:
a watch having a watch face; and
an intelligent display system disposed substantially adjacent the watch face, the display system comprising:
a first display panel;
a second display panel behind the first display panel;
a memory having programming instructions thereon; and
a controller in communication with the first display panel and the second display panel, and the memory;
wherein;
the first display panel is configured to display a first piece of content;
the second display panel is configured to display a second piece of content; and
the first piece of content and the second piece of content together form a complete content.

17. The system of claim 16, further comprising a sensor.

18. The system of claim 17, wherein a first portion of the first piece of content and a first portion of the second piece of content are adjusted in response to a user detection made by the sensor.

19. The system of claim 18, wherein a second portion of the first piece of content and a second portion of the second piece of content remain stationary when the respective first portions adjust in response to the user detection.

20. The system of claim 17, wherein the sensor comprises a biometric sensor.

* * * * *